H. L. BUSH AND A. J. BRYAN.
SPRING WHEEL.
APPLICATION FILED JULY 13, 1920.
1,392,813.
Patented Oct. 4, 1921.
3 SHEETS—SHEET 1.
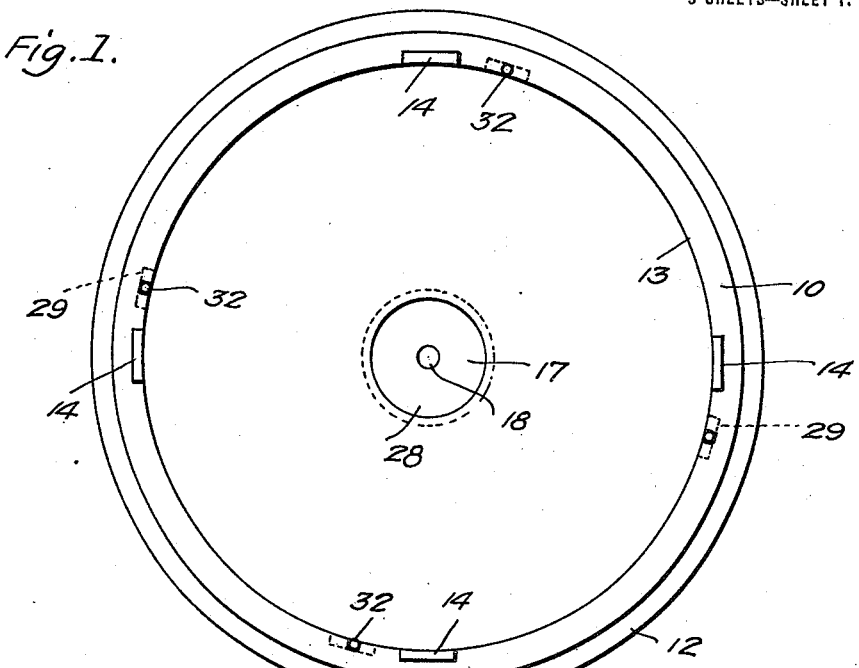
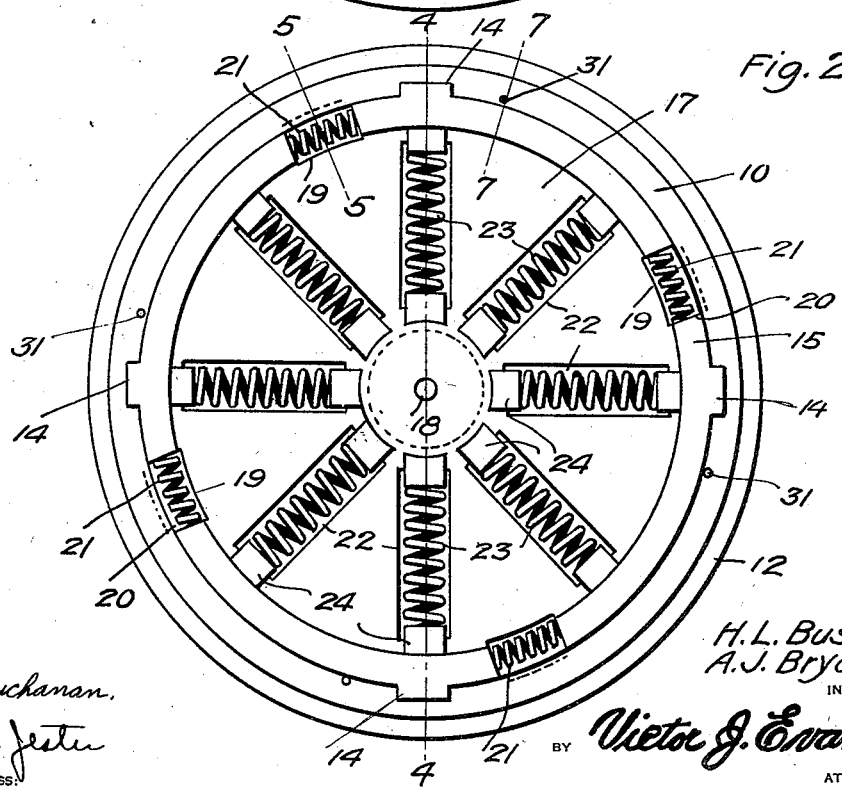

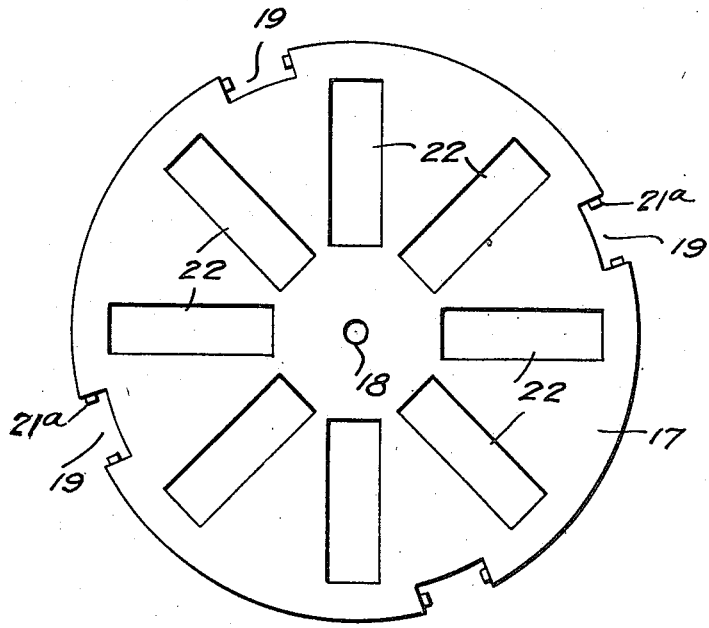
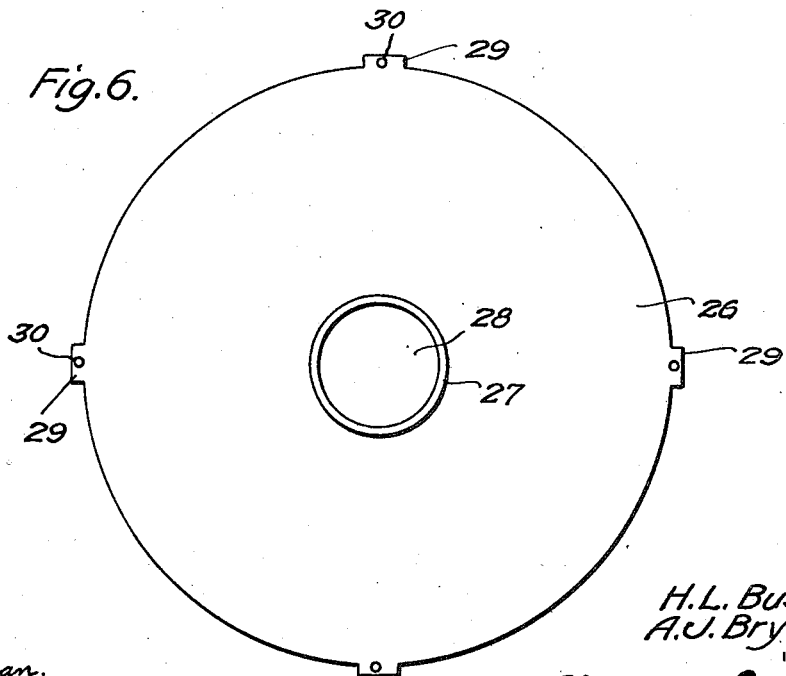

H. L. BUSH AND A. J. BRYAN.
SPRING WHEEL.
APPLICATION FILED JULY 13, 1920.
1,392,813. Patented Oct. 4, 1921.
3 SHEETS—SHEET 3.
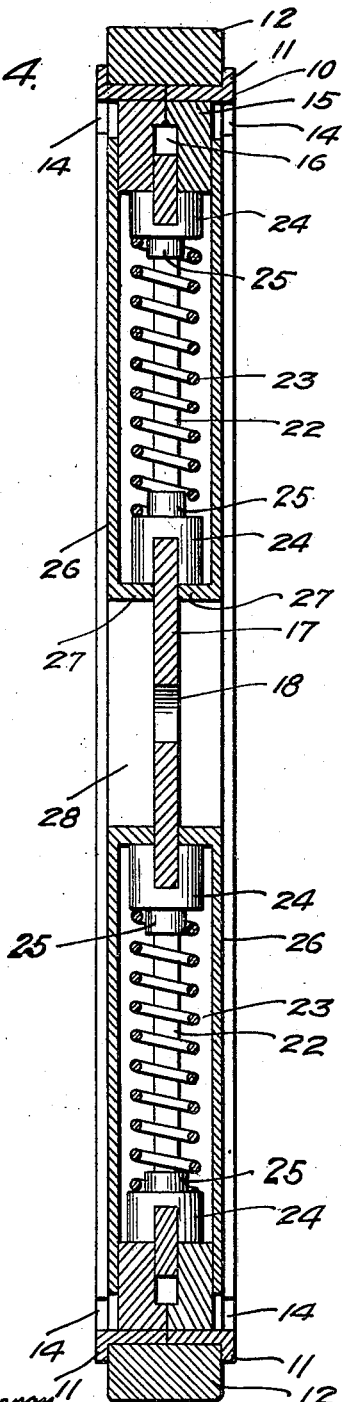
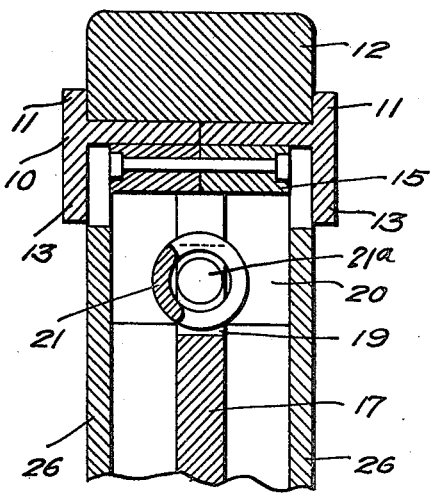
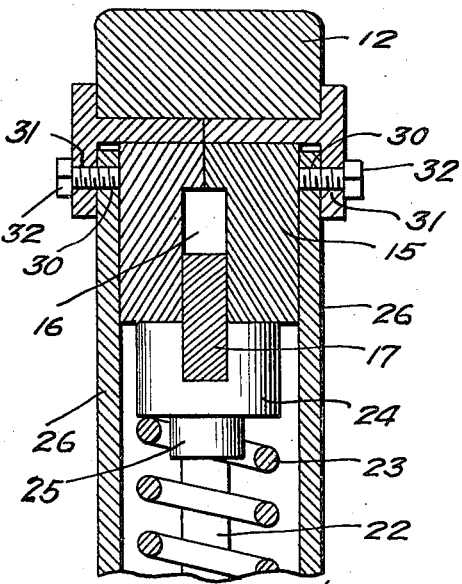
H. L. Bush
A. J. Bryan INVENTOR
BY Victor J. Evans
ATTORNEY

UNITED STATES PATENT OFFICE.

HORACE L. BUSH AND ANDREW J. BRYAN, OF GRAHAM, TEXAS.

SPRING-WHEEL.

1,392,813.  Specification of Letters Patent.  Patented Oct. 4, 1921.

Application filed July 13, 1920. Serial No. 395,833.

*To all whom it may concern:*

Be it known that we, HORACE L. BUSH and ANDREW J. BRYAN, citizens of the United States, residing at Graham, in the county of Young and State of Texas, have invented new and useful Improvements in Spring-Wheels, of which the following is a specification.

This invention relates to vehicle wheels, particularly to those of the resilient type obviating the use of the pneumatic tires, and has for its object the provision of a spring wheel embodying in its use relatively movable members having coil springs interposed therebetween whereby to secure the proper resilience, resilient means being also provided for preventing circumferential movement of the relatively movable members while at the same time cushioning the shocks and jars incidental to stopping and starting.

An important object is the provision of a spring wheel of this character which includes very few parts, all of which are constructed of metal so that the wheel will be extremely durable.

Another object is the provision of a wheel of this character which has its side covered by plates rigidly secured to the rim but detachably engaged therewith so that they may be removed to permit access to the interior for the purpose of replacing any broken spring.

An additional object is the provision of a wheel of this character which will be comparatively simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of the complete wheel.

Fig. 2 is a similar view with the cover plate removed,

Fig. 3 is a similar view of the central spring carrying member detached,

Fig. 4 is a cross sectional view on the line 4—4 of Fig. 2,

Fig. 5 is a detail cross sectional view on the line 5—5 of Fig. 2,

Fig. 6 is an elevation of the cover removed, and

Fig. 7 is a detail cross sectional view on the line 7—7 of Fig. 2.

Referring more particularly to the drawings, the numeral 10 designates a rim which may be formed of sheet metal stamped to shape and which has its side edges formed with outwardly extending flanges 11 for retaining a cushion tire 12 and which also has its side edges formed with inwardly extending flanges 13 provided at intervals with notches 14.

The numeral 15 designates the felly body which is formed upon its inner periphery with an outwardly extending circumferential slot 16. This felly body is formed of mating sections, as shown, secured together by any desired means, and these mating sections are recessed at their confronting edges to define the slot 16. The rim is secured to the felly by any desired means, not shown as not essential.

Disposed within the confines of the rim is a disk 17 of sheet metal which has its outer portion seating within the slot 16 and this disk is formed centrally with a hole 18 for the passage of the vehicle axle or spindle, as the case may be. In case the wheel is intended to be used upon the front of a vehicle, the hole 18 permits the passage of the bearing spindle and in case the wheel is used on the rear of a vehicle the rear axle is of course secured within the hole 18. At its periphery this disk 17 is formed with recesses 19 which register with similar recesses 20 formed in the felly body 15 and engaged within the registering recesses are springs 21 which operate to prevent circumferential movement of the disk 17 with respect to the felly body and rim. The springs are held in position by being engaged upon projections 21ª. In case the wheel is used upon the front of a vehicle these registering notches and springs may be omitted. The disk 17 is formed with a circular series of cut-out portions or elongated slots 22 within each of which is disposed a coil spring 23 having its ends engaging disks 24 which are radially slidably engaged upon the member 17 at the ends of the openings and formed with projections 25 extending into the spring. These disks 24 being of considerably greater diameter than the thickness of the disk 17, will extend outwardly beyond the sides of the latter and the outermost disks 24 will engage against the inner periphery of the felly body. The function of the inner set of disks 24 will be hereinafter set forth.

The numeral 26 designates the side plates of the wheel which may be similar and each of which includes a laterally extending flange 27 surrounding a relatively large opening 28 for the passage of the hub, not shown. The flanges 27 on the plates 26 extend toward each other and engage against the disk 17 and their outer peripheries provide abutments for the inner set of disks 24, as clearly shown is Fig. 4.

In order that the plates 26 may be secured with respect to the rim 10, each plate 26 has its outer periphery formed with a series of lugs 29 adapted to be passed through the notches 14 in the rim flanges 13, after which the plates are subsequently rotated a slight distance to bring holes 30 in the lugs into registration with holes 31 formed in the flanges 13, and suitable bolts 32 are then inserted through these registering holes.

When the wheel is constructed and assembled as above described, it will be seen that owing to the engagement of the flanges 27 with the inner set of disks 24 engaging the springs 23, the felly and rim of the wheel will be resiliently supported so that an efficient cushioning action is obtained. It is of course apparent that the opening 28 must be sufficiently larger than the hub used in connection with the wheel so as to permit the resilient action. One important feature of advantage is that the springs are compressed both at the top and bottom of the wheel under downward movement of the hub.

While we have shown and described the preferred embodiment of our invention, it is of course to be understood that we reserve the right to make such changes in the form, construction, and arrangement of parts as will not depart from the spirit of the invention or the scope of the subjoined claims.

Having thus described our invention, we claim:

1. A spring wheel comprising a rim, a felly body secured to said rim and formed of mating sections recessed upon their confronting faces to define a slot when assembled, a disk having a central hole for conforming engagement upon an axle and having its outer portion seating within said slot, said disk being formed with openings arranged in a circular series, coil springs disposed within said openings, disks engaging the ends of said springs with the outer set of disks engaging the inner periphery of the felly, and cover plates connected with the rim and formed centrally with relatively large openings for the passage of a hub and having said openings surrounded by flanges extending toward each other and constituting an abutment for the inner set of disks engaging the springs.

2. A spring wheel comprising a rim, a felly body secured to said rim and formed of mating sections recessed upon their confronting faces to define a slot when assembled, a disk having a central hole for conforming engagement upon an axle and having its outer portion seating within said slot, said disk being formed with radial openings arranged in a circular series, coil springs disposed within said openings, outer and inner sets of disks engaging the ends of said springs with the outer set of disks engaging the inner periphery of the felly, cover plates connected with the rim and formed centrally with relatively large openings for the passage of a hub and having said openings surrounded by flanges extending toward each other and constituting abutments for the inner set of disks engaging the springs, said felly and said disk being formed with registering recesses, and circumferentially disposed springs arranged within said registering recesses.

In testimony whereof we affix our signatures.

HORACE L. BUSH.
ANDREW J. BRYAN.